(12) United States Patent
Kawaguchi

(10) Patent No.: US 11,164,594 B2
(45) Date of Patent: Nov. 2, 2021

(54) ABNORMAL SOUND DETECTION SYSTEM, ARTIFICIAL SOUND CREATION SYSTEM, AND ARTIFICIAL SOUND CREATING METHOD

(71) Applicant: Hitachi, Ltd., Tokyo (JP)

(72) Inventor: Yohei Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/892,936

(22) Filed: Jun. 4, 2020

(65) Prior Publication Data

US 2020/0402527 A1 Dec. 24, 2020

(30) Foreign Application Priority Data

Jun. 21, 2019 (JP) .............................. JP2019-115257

(51) Int. Cl.
*G10L 21/04* (2013.01)
*G10L 25/30* (2013.01)
*G10L 25/18* (2013.01)

(52) U.S. Cl.
CPC .............. *G10L 21/04* (2013.01); *G10L 25/18* (2013.01); *G10L 25/30* (2013.01)

(58) Field of Classification Search
CPC ......... G10L 25/51; G10L 25/30; G10L 25/18; G10L 15/16; G10L 15/30; G10L 17/18; G10L 15/14; G10L 2025/783; G10L 21/0216; G10L 21/04
USPC ............ 381/56, 58, 61–65, 67, 122, 317, 26
See application file for complete search history.

(56) References Cited

U.S. PATENT DOCUMENTS

2020/0233397 A1* 7/2020 Bello ................... G05B 19/408

FOREIGN PATENT DOCUMENTS

JP 2012-138826 A 7/2012

\* cited by examiner

*Primary Examiner* — Norman Yu
(74) *Attorney, Agent, or Firm* — Crowell & Moring LLP

(57) ABSTRACT

Confirmation can be made what sound has been made under a restriction in which transmittable traffic is small. An abnormal sound detection system including an artificial sound creating function is configured, the abnormal sound detection system including a statistic calculation unit configured to calculate a statistic set expressing sizes of a direct current component, an alternating current component, and a noise component in an amplitude time series at each of frequencies of a sound inputted at a terminal, a statistic transmitting unit configured to transmit the statistic set from the terminal to a server, a statistic receiving unit configured to receive the statistic set in the server, and an artificial sound reproducing unit configured to reproduce a cyclostationary artificial sound based on the statistic set received in the server.

6 Claims, 7 Drawing Sheets

ABNORMAL SOUND DETECTION SYSTEM, ARTIFICIAL SOUND CREATION SYSTEM, AND ARTIFICIAL SOUND CREATING METHOD

BACKGROUND

The present invention relates to an abnormal sound detection system, an artificial sound creation system, and an artificial sound creating method.

The states of the signs of abnormalities or failures of machines and facilities, for example, often appear in sounds. Therefore, diagnosis based on the operating sound of the facility is important in order to grasp the state of the facility for the purpose of the maintenance of the facility, for example. In an environment in which supply from an external power supply is difficult, a configuration is provided in which a terminal that is installed on facilities and that includes a microphone intermittently performs recording sounds and detection of abnormalities by battery drive for a long time and transmits the result of the presence or absence of an abnormality to a server at a remote site. However, even though the presence or absence of an abnormality alone is reported and accumulated on the server side, a user is not enabled to hear and confirm what sound has occurred at time instants after the occurrence of the abnormality.

Since the traffic that is transmittable by battery drive for a long time is considerably small, it is not possible to transmit even raw sound data or sound data in a typical compressed format. For example, as a method of communicating a sound, there is Japanese Unexamined Patent Application Publication No. 2012-138826. This publication describes that a system has a video receiving unit that receives an input signal inputted from an external peripheral device, a video encoder that receives a video signal outputted from the video receiving unit and forms an image compression signal, an audio encoder that receives an audio signal outputted from the video receiving unit and forms an audio compression signal, a first STC counter value creation unit that receives a video clock at 74.25 MHz outputted from the video receiving unit and forms a first STC counter value, and a PCR creation unit that receives the first STC counter value and creates a PCR, and the first STC counter value creation unit performs a counter operation of performing four increments at every 11 cycles of the video clock and creates an STC counter value.

SUMMARY

As described above, since the traffic that is transmittable by battery drive is considerably limited, it is not possible to transmit even raw sound data or sound data in a typical compressed format. The invention disclosed in Japanese Unexamined Patent Application Publication No. 2012-138826 describes the audio encoder that forms an audio compression signal. However, it is not possible to use the audio encoder by battery drive for a long time. A typical audio encoder performs fast Fourier transform (FFT) or discrete cosine transform (DCT) for quantization at a quantization bit rate different at every frequency, and compresses the audio signal. However, the traffic of the transmission data inevitably exceeds the traffic that is transmittable by battery drive.

Therefore, the present invention is to determine a target sound, such as an abnormal sound, even the traffic of transmittable sound data is small.

A preferable example of an abnormal sound detection system according to an aspect of the present invention is an abnormal sound detection system that determines an abnormal sound included in sound data, the abnormal sound detection system including a terminal and a server. In the abnormal sound detection system, the terminal has a logarithmic mel spectrogram computing unit configured to accept an input of the sound data and compute a logarithmic mel spectrogram, a statistic calculation unit configured to calculate a statistic set that expresses sizes of a direct current component, an alternating current component, and a noise component in an amplitude time series at each of frequencies from the logarithmic mel spectrogram, and a statistic transmitting unit configured to transmit the statistic set. The server has a statistic receiving unit configured to receive the statistic set, a feature value vector creation unit configured to extract a feature value vector from a pseudo-logarithmic mel spectrogram created from the statistic set, and a normal sound model learning unit configured to learn a normal sound model using the feature value vector. The terminal extracts a feature value vector from the logarithmic mel spectrogram, the terminal receives a normal sound model from the server, the terminal computes a value corresponding to a probability or a distance where the feature value vector is created from the normal sound model, and the terminal determines that operating sound includes an abnormal sound when the value corresponding to the probability or the distance is less than a predetermined value and makes a report to the server.

Another aspect of the present invention, in the abnormal sound detection system, the abnormal sound detection system further includes, on a previous stage of the logarithmic mel spectrogram computing unit of the terminal, a non-stationary component removing unit configured to remove non-stationary sound from a power spectrogram created from the inputted sound data and extract a cyclostationary sound.

Still another aspect of the present invention, in the server of the abnormal sound detection system, a pseudo-spectrogram direct reconstruction unit is further included, the pseudo-spectrogram direct reconstruction unit being configured to, based on an uncompressed operating sound recorded beforehand from a diagnosis target facility and a statistic set expressing sizes of a direct current component, an alternating current component, and a noise component in an amplitude time series at each of frequencies calculated from the uncompressed operating sound, learn mapping from the statistic set to a spectrogram of an uncompressed sound, and create a pseudo-power spectrogram from the statistic set received in the server based on the learned mapping.

A preferable example of an artificial sound creation system according to an aspect of the present invention is an artificial sound creation system including a terminal and a server. In the artificial sound creation system, the terminal has a logarithmic mel spectrogram computing unit configured to accept an input of sound data and compute a logarithmic mel spectrogram, a statistic calculation unit configured to calculate a statistic set expressing sizes of a direct current component, an alternating current component, and a noise component in an amplitude time series at each of frequencies from the logarithmic mel spectrogram, and a statistic transmitting unit configured to transmit the statistic set. The server has a statistic receiving unit configured to receive the statistic set, a pseudo-spectrogram reconstruction unit configured to multiply the pseudo-logarithmic mel spectrogram created from the statistic set by a pseudo-inverse matrix of a mel filter bank and compute a pseudo-power spectrogram, a frequency-time domain conversion unit configured to create a phase component at each of frequencies on the pseudo-power spectrogram, to combine the pseudo-power spectrogram and the phase component, and output a digital output signal in a time domain, and an artificial sound reproducing unit configured to reproduce the digital output signal in a time domain.

A preferable example of an artificial sound creating method according to an aspect of the present invention is an artificial sound creating method. In the artificial sound creating method, a terminal including a microphone and an AD converter calculates a power spectrogram from an inputted acoustic signal; the terminal computes a logarithmic mel spectrogram from the power spectrogram; the terminal calculates a statistic set expressing sizes of a direct current component, an alternating current component, and a noise component in an amplitude time series at each of frequencies from the logarithmic mel spectrogram; the terminal transmits the statistic set to a server; the server receives the statistic set from the terminal; the server creates a pseudo-logarithmic mel spectrogram from the statistic set; the server multiplies the pseudo-logarithmic mel spectrogram by a pseudo-inverse matrix of a mel filter bank and computes a pseudo-power spectrogram; the server creates a phase component at each of frequencies on the pseudo-power spectrogram, combines the pseudo-power spectrogram and the phase component, and creates a digital output signal in a time domain; and the server reproduces the digital output signal in a time domain as an artificial sound.

According to the aspects of the present invention, even though transmittable traffic is small, necessary and sufficient data is transmitted from a terminal to a server, an artificial sound created from received data is reproduced, and thus a sound can be confirmed.

DETAILED DESCRIPTION

In the following, embodiments will be described with reference to the drawings.

First Embodiment

Figure 1:
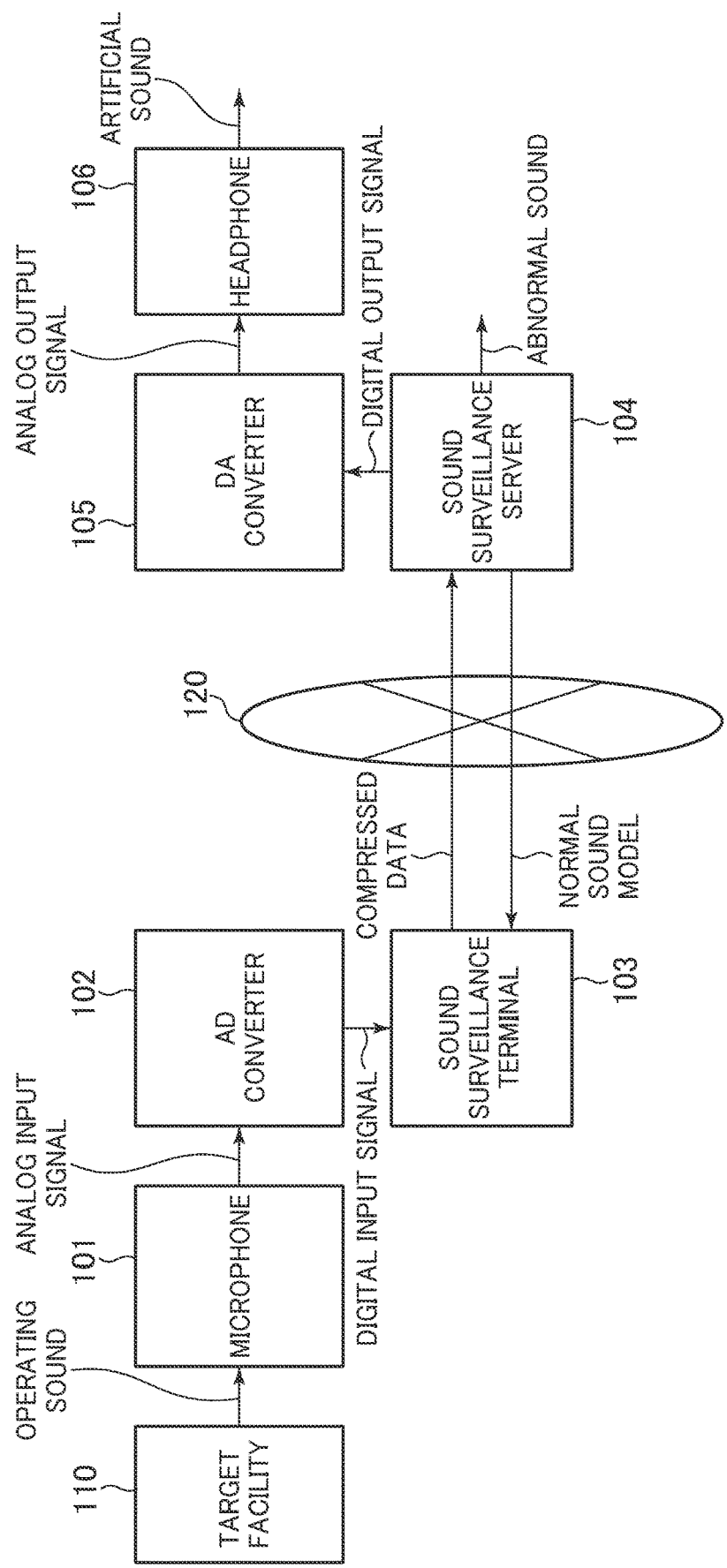
FIG. 1 is a block diagram showing the hardware configuration of an abnormal sound detection system including an artificial sound creating function.

FIG. 1 is a block diagram showing the hardware configuration of an abnormal sound detection system including an artificial sound creating function.

A microphone 101 sends the operating sound of a target facility 110 that is installed in an analog input signal as an input to an AD converter 102 at every predetermined period or every time of day specified by a user, for example.

The AD converter 102 converts the inputted analog input signal into a digital input signal, and sends the digital input signal to a sound surveillance terminal 103.

The sound surveillance terminal 103 uses the digital input signal as an input, converts the digital input signal into the statistics (compressed data) of a direct current component, a periodic component, and an independent identically distributed component in an amplitude time series at each of frequencies, and sends the statistics to a sound surveillance server 104 at a remote site through a network 120 including a wireless network.

The sound surveillance server 104 uses the statistics as an input, and sends an artificial sound that simulates the operating sound of the target facility 110 to a DA converter 105 as a digital output signal.

The DA converter 105 converts the inputted digital output signal into an analog output signal, sends the analog output signal to a headphone 106, and outputs the artificial sound from the headphone 106.

The sound surveillance terminal 103 can be configured on a general-purpose computer terminal including a battery and a wireless communication unit. The sound surveillance server 104 can be configured on a general-purpose computer, in which an abnormal sound detection program stored on storage units is loaded to a RAM, and executed by a CPU, and then functional units below are implemented.

Figure 2:
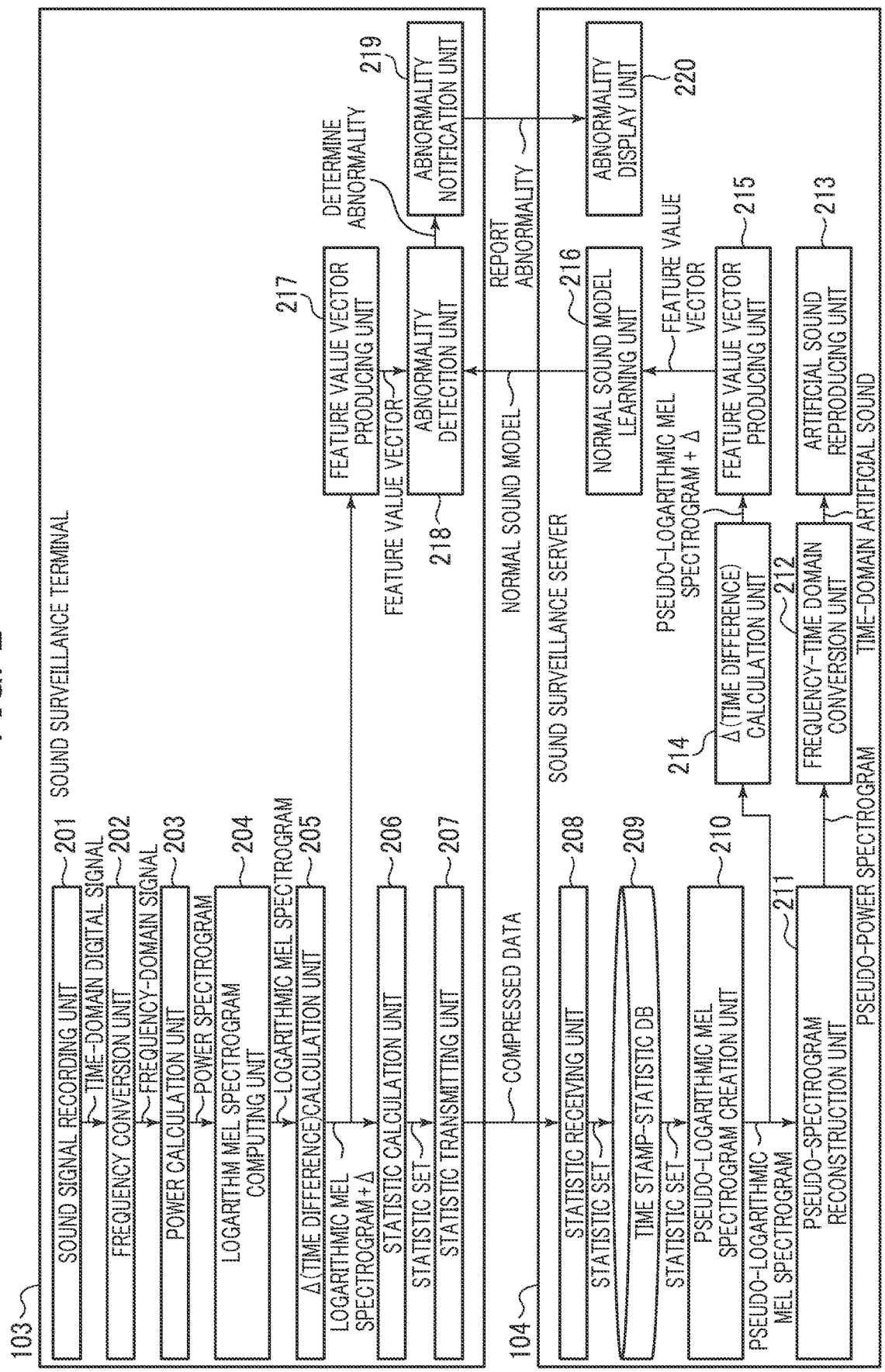
FIG. 2 is a block diagram showing the configuration of processes on a sound surveillance terminal and a sound surveillance server according to a first embodiment.

FIG. 2 is a block diagram showing the configuration of processes in the present embodiment. The processes in the present embodiment are divided into the process on the sound surveillance terminal 103 side and the process on the sound surveillance server 104 side.

First, on the sound surveillance terminal 103 side, a sound signal recording unit 201 acquires an operating sound through the microphone 101 and an acoustic signal that an analog input signal is converted into a digital input signal by the AD converter 102 is stored on a memory in a unit of FFT frame size.

A frequency conversion unit 202 splits the digital input signal by each frame, the frame is multiplied by a window function, the signal after multiplied by the window function is subjected to short-time Fourier transform, and a frequency-domain signal is outputted. When the frame size is N, the frequency-domain signal is a set of K complex numbers where one complex number corresponds to each of (N/2+1)=K frequency bins.

A power calculation unit 203 calculates a power spectrogram X from the frequency-domain signal and outputs the power spectrogram X. The power spectrogram X is a K×T matrix in which a frequency spectrum, which is formed of the intensity (amplitude) components of the frequencies divided into K frequency bins, produced for every frame size (unit time), is arrayed in each column, and is disposed in a time series in a horizontal axis (time base) direction for analysis time t. In X, the vertical axis expresses the frequency, and the horizontal axis expresses time.

A logarithmic mel spectrogram computing unit 204 calculates a logarithmic mel spectrogram Y from the power spectrogram X, and outputs the logarithmic mel spectrogram Y.

Here, generally, human ears do not hear sounds at actual frequencies as they are, a shift occurs, and sounds near the upper limit of an audible range are heard lower than actual sounds. The frequency at which this shift is adjusted to the scale that measures the level of sounds perceived by human beings is referred to as a mel (scale) frequency. A mel filter bank, which is a filter that extracts only specific frequency bands at regular intervals by the mel scale, is applied to the power spectrogram X, and the logarithmic mel spectrogram Y is calculated.

That is, the logarithmic mel spectrogram computing unit 204 applies the filters of the mel filter bank to the power spectrogram X, power after filtering is summed to take a logarithm, and smoothes logarithms the logarithmic mel spectrogram Y that is an M×T matrix in which frequencies from the lower limit frequency to the upper limit frequency are split into M mel frequency bins at a mel (scale) frequency at regular intervals.

Note that Y that is calculated by the logarithmic mel spectrogram computing unit 204 may be a given spectrogram that expresses the frequency power characteristics, such as an octave band spectrogram, one-third octave band spectrogram, and gamma tone spectrogram, instead of the logarithmic mel spectrogram.

A Δ (time difference) calculation unit 205 calculates a time difference signal Δ of the logarithmic mel spectrogram Y from the logarithmic mel spectrogram Y, and outputs a set of the logarithmic mel spectrogram Y and Δ.

The component values of the logarithmic mel spectrogram Y that is an M×T matrix is expressed by y(m, t), the time difference signal Δ of the logarithmic mel spectrogram Y is an M×(T−1) matrix, and its component value δy(m, t)=y(m, t)−y(m, t−1) is computed.

A statistic calculation unit 206 calculates a statistic set of the mel frequency bins m from a set of the logarithmic mel spectrogram Y and the time difference signal Δ, and outputs the statistic set of the mel frequency bins m.

The statistic set is, for example, a mean value μ(m) of the component values y(m, t) of the logarithmic mel spectrogram Y in the row of the mel frequency bin m, a standard deviation σ(m), and a standard deviation σΔ(m) of the component values δy(m, t) in the row of the mel frequency bin m of the time difference signal Δ. The mean value μ(m) expresses the direct current component of the amplitude time series, and the standard deviation σ(m) expresses the independent identically distributed component. σΔ(m)/σ(m) expresses the periodic component of the amplitude time series.

A statistic transmitting unit 207 converts the statistic set into a communication packet, and transmits the communication packet.

Subsequently, on the sound surveillance server 104 side, a statistic receiving unit 208 converts the received communication packet into a statistic set, and stores the statistic set on a time stamp-statistic DB 209 together with a time stamp that is a received date and time, for example.

A pseudo-logarithmic mel spectrogram creation unit 210 reads a statistic set at a time stamp corresponding to the time of day specified by a user from the time stamp-statistic DB 209, calculates a pseudo-logarithmic mel spectrogram Z from the read statistic set (μ(m), σ(m), σΔ(m)), and outputs the pseudo-logarithmic mel spectrogram Z. When it is assumed that the operating sound of the facility is a cyclostationary sound, components z(m, t) of the pseudo-logarithmic mel spectrogram Z can be calculated from Equation (1), where γ is a constant parameter from 0 to 1, ω=2 sin^−1 (0.5 σΔ(m)/σ(m)), φ is an option, and r is a probability variable that follows a normal distribution N(0, σ(m)).

[Equation 1]

$$z(m,t)=\mu(m)+\sqrt{2\gamma}\sigma(m)\sin(\omega t+\varphi)+\sqrt{(1-\gamma)}r \qquad (1)$$

The statistic calculation unit 206 may calculate statistic sets of the mel frequency bins m from the logarithmic mel spectrogram Y not through the Δ (time difference) calculation unit 205, and may output the statistic sets of the mel frequency bins m.

In this case, the statistic set is, for example, the mean value μ(m) of the component values y(m, t) of the logarithmic mel spectrogram Y in the row of the mel frequency bin m, an angular frequency ω(m) of an alternating current component whose amplitude spectrum obtained by Fourier transform in the direction of time t to y(m, t) is at the maximum, an amplitude a(m) of the angular frequency ω(m), and a standard deviation σ_e(m) of a residual e(m, t), where the residual e(m, t) is expressed from Equation (2).

[Equation 2]

$$e(m,t)=\min\_\varphi(m)|y(m,t)-\mu(m)-a(m)\sin(\omega(m)t+\varphi(m))| \qquad (2)$$

In this case, the components z(m, t) of the pseudo-logarithmic mel spectrogram Z can be calculated from Equation (3).

[Equation 3]

$$z(m,t)=\mu(m)+a(m)\sin(\omega(m)t+\varphi(m))+r \qquad (3)$$

where φ(m) is an option, and r is a probability variable that follows a normal distribution N (0, σ_e(m)).

A pseudo-spectrogram reconstruction unit 211 calculates a pseudo-power spectrogram ˆX from the pseudo-logarithmic mel spectrogram Z, and outputs the pseudo-power spectrogram ˆX. For example, the pseudo-logarithmic mel spectrogram Z is multiplied by the pseudo-inverse matrix of the mel filter bank, and thus the pseudo-power spectrogram ˆX can be calculated.

A frequency-time domain conversion unit 212 uses the pseudo-power spectrogram ˆX as an input, creates a phase component at each of frequencies which the pseudo-power spectrogram ˆX does not include, combines the pseudo-power spectrogram ˆX with the created phase components, and outputs a digital output signal in the time domain. For creating the phase components, a Griffin-Lim algorithm, for example, is used.

Here, since the pseudo-power spectrogram ˆX is at frequency-domain signal level and the phase component disappears, the phase components are created using the Griffin-Lim algorithm, and an acoustic signal (time-domain artificial sound) in the time domain is reconstructed.

An artificial sound reproducing unit 213 converts the digital output signal (time-domain artificial sound) into an analog output signal by the DA converter 105, and outputs the analog output signal from the headphone 106.

In the case in which transmittable traffic is small as described above, it is not possible to send raw sound data or sound data in a typical compressed format from the terminal to the server, and it is not possible to perform the learning of a normal sound model for abnormality detection using these pieces of sound data. The raw sound data is obtained only in recording in the initial installation and in the initial calibration. Therefore, conventionally, the normal sound model is learned using only sound data in the initial installation and in the initial calibration. However, in the present embodiment, only the statistic set is transmitted and received, and thus artificial sounds can be continuously accumulated in normal time. The normal sound model can be learned based on the artificial sound or a feature value vector calculated from the artificial sound. For example, such sequential learning exerts the effect that no error occurs in abnormality detection even though seasonal variations are present. Since learning can be performed using a large number of pieces of data, such sequential learning exerts the effect that considerably improves accuracy. In the following, a series of processes that exerts this effect will be shown.

First, on the sound surveillance server 104 side, a Δ (time difference) calculation unit 214 calculates a time difference signal Δ of the pseudo-logarithmic mel spectrogram Z from the pseudo-logarithmic mel spectrogram Z, and outputs a set of the pseudo-logarithmic mel spectrogram Z and Δ.

When the component values of the pseudo-logarithmic mel spectrogram Z that is an M×T matrix are expressed by z(m, t), the time difference signal Δ of the component values is an M×(T−1) matrix, and the component value is computed as a component value δz(m, t)=z(m, t)−z(m, t−1).

A feature value vector producing unit 215 uses a set of the pseudo-logarithmic mel spectrogram Z (M×T dimensions of M mel frequency bins) and Δ (M×(T−1) dimensions of M mel frequency bins) as an input, and forms a matrix in the 2M×(T−1) dimensions in which the set is joined in the row direction (in the vertical direction). For example, the matrix in the M×(T−1) dimensions is formed together with the number of columns of A except one column (t=0) of the pseudo-logarithmic mel spectrogram Z, these two matrices are joined to each other in the row direction (in the vertical direction), and the matrix in the 2M×(T−1) dimensions is configured.

From the matrix in the 2M×(T−1) dimensions, (T−L) feature value vectors in the 2M×L dimensions are extracted while the feature value vector is shifted one column by one column (in this case, there are (T−L) feature value vectors, for example).

A normal sound model learning unit 216 learns a normal sound model that expresses a distribution in a normal state using a large number of the feature value vectors, and transmits the learned normal sound model to an abnormality detection unit 218 of the sound surveillance terminal 103. In learning, in order to avoid overlearning, not only (T−L) feature value vectors that are extracted from one pseudo-logarithmic mel spectrogram Z are used but also the feature value vector extracted from a large number of the pseudo-logarithmic mel spectrograms Z are used (the pseudo-logarithmic mel spectrogram Z is produced as may as possible anytime from the statistic set sent from the sound surveillance terminal 103 and used for learning the normal sound model).

As the normal sound model, a gaussian mixture distribution (GMM), one-class support classifier, subspace method, local subspace method, k-means clustering, Deep Neural Network (DNN) autoencoder, Convolutional Neural Network (CNN) autoencoder, Long Short Term Memory (LSTM) autoencoder, and variational autoencoder (VAE), for example, may be used.

In regard to the normal sound models, there are known algorithms that are suited to the individual models, and these algorithms are used. For example, when the model is GMM, fitting is performed by the combination the gaussian distribution by a predetermined number of clusters based on the EM algorithm. The learned normal sound model is defined by computed model parameters. All the model parameters are stored on a normal sound model database, not shown.

In the case of GMM, for example, the model parameters stored on the normal sound model database are a mean vector (2M×L dimensions) μq of Q clusters q=1, . . . Q, a covariance matrix (2M×L×2M×L dimensions) Γq of the clusters, and a weighting factor (one dimension) πq of the clusters.

In the execution of an abnormality detection process at the abnormality detection unit 218 of the sound surveillance terminal 103, a corresponding normal sound model is read from the normal sound model database and transmitted.

Subsequently, on the sound surveillance terminal 103, a feature value vector producing unit 217 uses, as an input, a set of the logarithmic mel spectrogram Y (M×T dimensions of M mel frequency bins) and Δ (M×(T−1) dimensions of M mel frequency bins) inputted from the A (time difference) calculation unit 205, forms a matrix in the 2M×(T−1) dimensions in which the sets are joined in the row direction (in the vertical direction). For example, the matrix in the M×(T−1) dimensions is formed together with the number of columns of A except one column (t=0) of the logarithmic mel spectrogram Y, these two matrices are joined to each other in the row direction (in the vertical direction), and the matrix in the 2M×(T−1) dimensions is configured. From the matrix in the 2M×(T−1) dimensions, (T−L) feature value vectors v in the 2M×L dimensions are extracted while the feature value vector is shifted one column by one column (there are (T−L) feature value vectors).

The abnormality detection unit 218 reads the learned normal sound model from the normal sound model database (not shown in the drawing) of the sound surveillance server 104 beforehand, and determines whether the feature value vector v inputted from the feature value vector producing unit 217 is normal or abnormal. That is, the abnormality detection unit 218 determines whether the feature value vector v produced from the inputted operating sound is possibly created from the normal sound model at a sufficient probability.

For example, in the case in which the normal sound model is GMM, a probability p(v|Θ) at which the feature value vector v in the 2M×L dimensions is created from a normal sound model (a model parameter Θ=((μ$_1$, Γ$_1$, π$_1$), . . . (μ$_q$, Γ$_q$, π$_q$), (μ$_q$, Γ$_q$, π$_q$)) is calculated from Equation (4).

[Equation 4]

$$p(v \mid \Theta) = \sum_{q=1}^{Q} \pi_q N(v \mid \mu_q, \Gamma_q) \quad (4)$$

where

[Equation 5]

$$N(v \mid \mu_q, \Gamma_q) = \frac{1}{(2\pi)^{1/d} |\Gamma_q|^{1/2}} \exp\left(-\frac{1}{2}(v - \mu_q)^T \Gamma_q^{-1} (v - \mu_q)\right) \quad (5)$$

When the probability p(v|Θ) is a predetermined probability or more, for example, the abnormality detection unit 218 determines that the operating sound (acoustic signal) of the machine facility that is a diagnosis target is a normal sound. For example, when the probability is less than a predetermined probability, the abnormality detection unit 218 determines that the operating sound includes an abnormal sound.

In the case in which a Deep Neural Network (DNN) autoencoder is used as a normal sound model, the internal parameters are optimized such that when the feature value vector of the normal sound is inputted by an optimization algorithm, such as SGD, Momentum SGD, AdaGrad, RMSprop, AdaDelta, and Adam, the distance between the inputted feature value vector and the feature value vector to be outputted is short. In the case in which the feature value vector of the abnormal sound is inputted, it is expected that the distance becomes longer. Thus, when this distance is less than a predetermined value, the abnormality detection unit 218 determines that the operating sound includes an abnormal sound.

In the case in which the abnormality detection unit 218 determines that the operating sound (acoustic signal) of the machine facility that is a diagnosis target includes an abnormal sound, an abnormality notification unit 219 reports the abnormality to the sound surveillance server 104.

An abnormality display unit 220 of the sound surveillance server 104 displays a message that the machine facility that is a diagnosis target is emitting an abnormal sound on a display unit, not shown in the drawing, and reports the abnormality, and notifies an external monitoring system about the abnormality. Alternatively, the abnormality display unit 220 may output the abnormality as a probability (abnormality probability) including an abnormal sound.

In the abnormal sound detection system including the artificial sound creating function according to the present embodiment, even though transmittable traffic is small, the terminal calculates the statistics of the direct current component, the periodic component, and the independent identically distributed component in the amplitude time series at each of the frequencies of the input sound and transmits the statistics, the statistics are received from the terminal, and an artificial sound is reproduced based on the statistics. Thus, the user can hear and confirm what the operating sound is like after the occurrence of the abnormality. Moreover, since artificial sounds can be continuously accumulated in normal time, sequential learning exerts the effect that no error occurs in abnormality detection even though seasonal variations are present. Since learning can be performed using a large number of pieces of data, such sequential learning exerts the effect that considerably improves accuracy.

Second Embodiment

In a second embodiment, an example of an abnormal sound detection system including an artificial sound creating function is disclosed which can highly accurately create an artificial sound even in the case in which a non-stationary sound, such as ambient noise, is mixed. The difference of the present embodiment from the first embodiment is in that a non-stationary component removing unit that removes a non-stationary sound is included in the process flow on the sound surveillance terminal, only a cyclostationary sound is extracted, a statistic set is highly accurately estimated from the cyclostationary sound, and an artificial sound can be highly accurately created from the statistic set.

Figure 3:
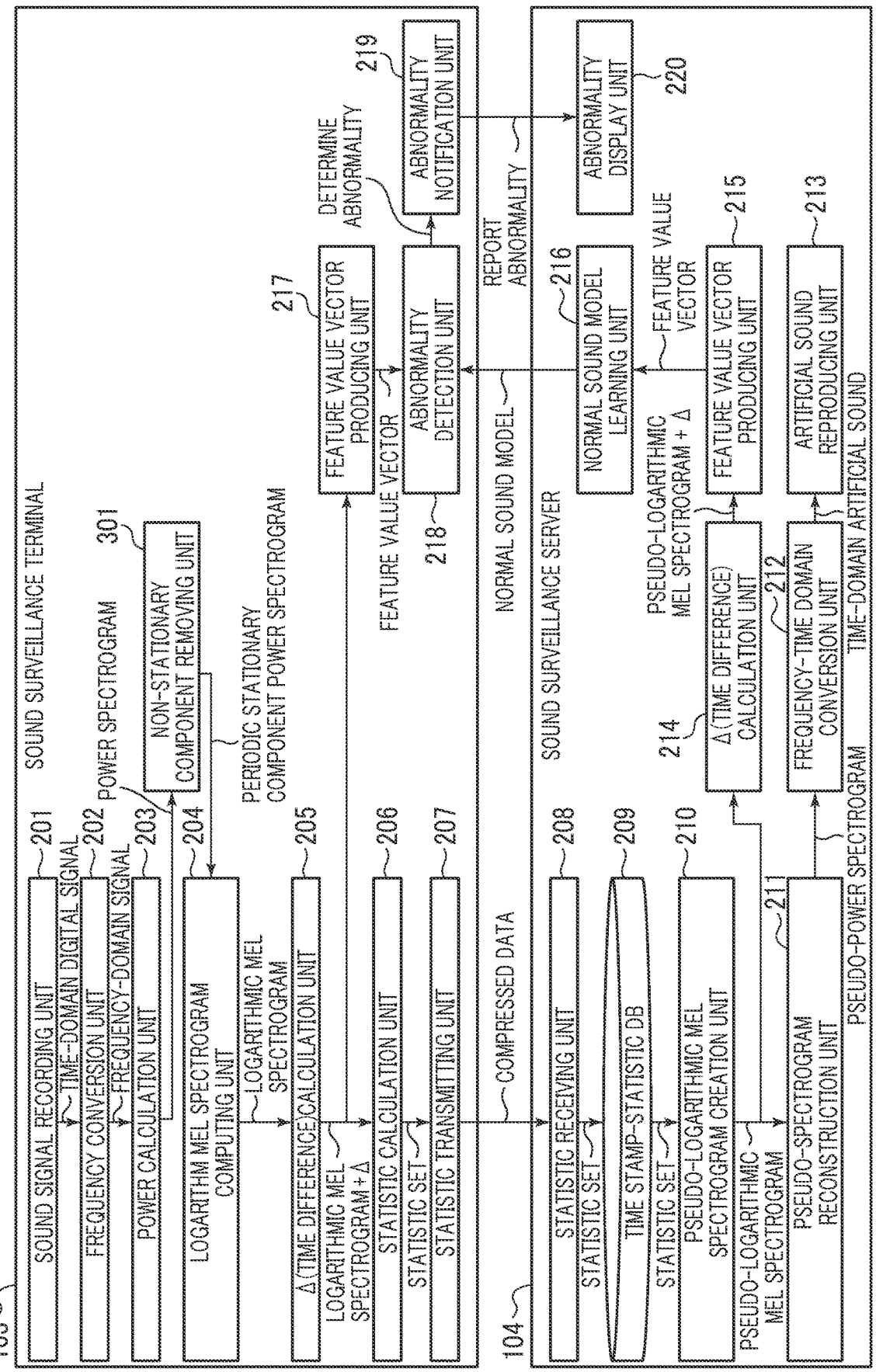
FIG. 3 is a block diagram showing the configuration of processes on a sound surveillance terminal and a sound surveillance server according to a second embodiment.

FIG. 3 is a block diagram showing the configuration of the second embodiment.

A non-stationary component removing unit 301 removes a non-stationary sound from a power spectrogram X sent from a power calculation unit 203, extracts only a cyclostationary sound, and sends the cyclostationary sound to a logarithmic mel spectrogram computing unit 204. As a specific processing method, Harmonic/Percussive Sound Separation (HPSS) and a Nearest Neighbor filter (NN filter) can be used.

HPSS is an algorithm that decomposes the inputted power spectrogram X into a component having a gentle time variation and a component having a steep time variation. A sound that is decomposed as a component having a steep time variation is a non-stationary sound when removed, and a component having a gentle time variation is close to a desired cyclostationary sound. The component having a gentle time variation extracted by HPSS is decomposed into a component that is repeatedly generated in the power spectrogram X and a component that is rarely generated using an NN filter. The component that is repeatedly generated is determined as a desired cyclostationary sound.

In the case in which a microphone array is used, a configuration may be provided in which only a sound in the direction of a target facility is extracted using a delay sum array, an MDVR beam former, and GEV beam former, and only the sound of the target facility is extracted. The adaption of an MDVR beam former or a GEV beam former can be controlled based on a time frequency mask on the basis of an SN ratio of the cyclostationary component outputted from the NN filter and the other component. Such a configuration is provided, even in an environment with a large sound reverberation, only the sound of the target facility can be highly accurately extracted using an MDVR beam former or a GEV beam former, only a cyclostationary sound is highly accurately extracted, a statistic set is highly accurately estimated from the cyclostationary sound, and an artificial sound can be highly accurately created from the statistic set.

Third Embodiment

In a third embodiment, an example of an abnormal sound detection system including an artificial sound creating function is disclosed which can highly accurately create an artificial sound can be created even though an operating sound has a micro harmonic structure. The difference of the present embodiment from the first embodiment is in that mapping that reconstructs a spectrogram from statistic sets based on recording in the initial installation and in the initial calibration is learned beforehand and a sound surveillance server has a pseudo-spectrogram direct reconstruction unit that reconstructs a spectrogram from statistic sets using the mapping.

Figure 4:
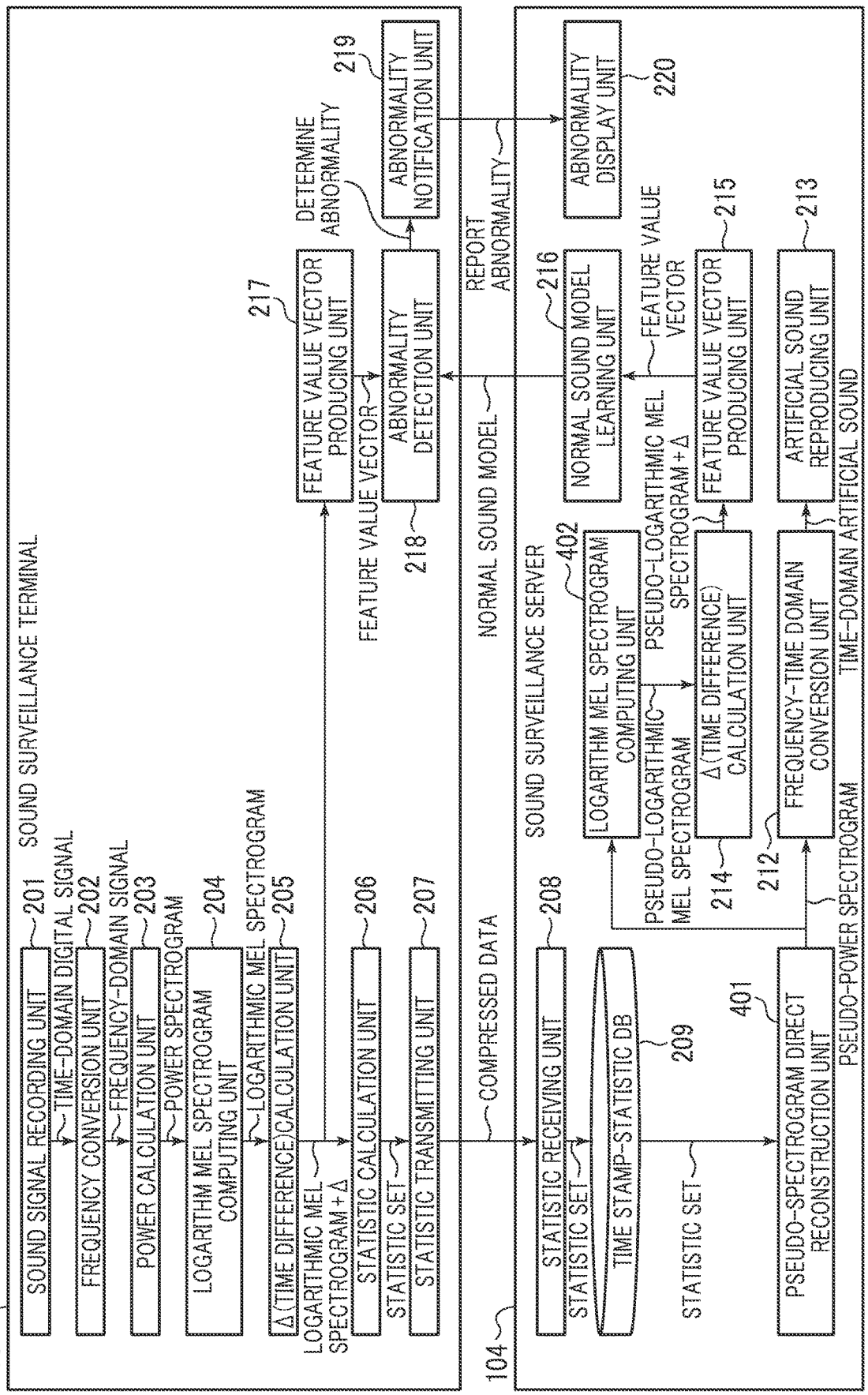
FIG. 4 is a block diagram showing the configuration of processes on a sound surveillance terminal and a sound surveillance server according to a third embodiment.

FIG. 4 is a block diagram showing the configuration of the third embodiment.

A pseudo-spectrogram direct reconstruction unit 401 reads a statistic set at a time stamp corresponding to the time of day specified by a user from a time stamp-statistic DB 209, and calculates a pseudo-power spectrogram $\hat{X}$ from the read statistic set ($\mu(m)$, $\sigma(m)$, $\sigma\Delta(m)$) and outputs the statistic set.

In the first embodiment, at the pseudo-spectrogram reconstruction unit 211, the pseudo-logarithmic mel spectrogram Z is multiplied by the pseudo-inverse matrix of the mel filter bank, and the pseudo-power spectrogram $\hat{X}$ is reconstructed. However, there is a faulty setting problem in which the number of unknown variables (a number K of frequency bins of a power spectrogram) is greater than the number of known variables (a number M of mel frequency bins of a logarithmic mel spectrogram), and reconstitution fails in the first place. When the operating sound of the target facility does not have a micro harmonic structure, a sufficiently useful artificial sound can be created even under this situation. However, in the case in which the operating sound of the target facility has a micro harmonic structure, this case is insufficient. In the third embodiment, in order to solve this problem, attention is focused on the fact that an uncompressed raw sound can be recorded in the initial installation and in the initial calibration (for example, the operating sound of a target facility for evaluation is recorded on a recording medium at a sound surveillance terminal 103, the recording medium is connected to a sound surveillance server 104, and a learning process is executed), and mapping that reconstructs a power spectrogram from the statistic set is learned beforehand. The mapping can complement information that is short in the faulty setting problem.

Similarly to the logarithmic mel spectrogram computing unit 204, a logarithmic mel spectrogram computing unit 402 calculates a (pseudo-)logarithmic mel spectrogram Z from the pseudo-power spectrogram ˆX sent from the pseudo-spectrogram direct reconstruction unit 401, and outputs the calculated (pseudo-)logarithmic mel spectrogram Z to a Δ calculation unit 214.

Figure 5:
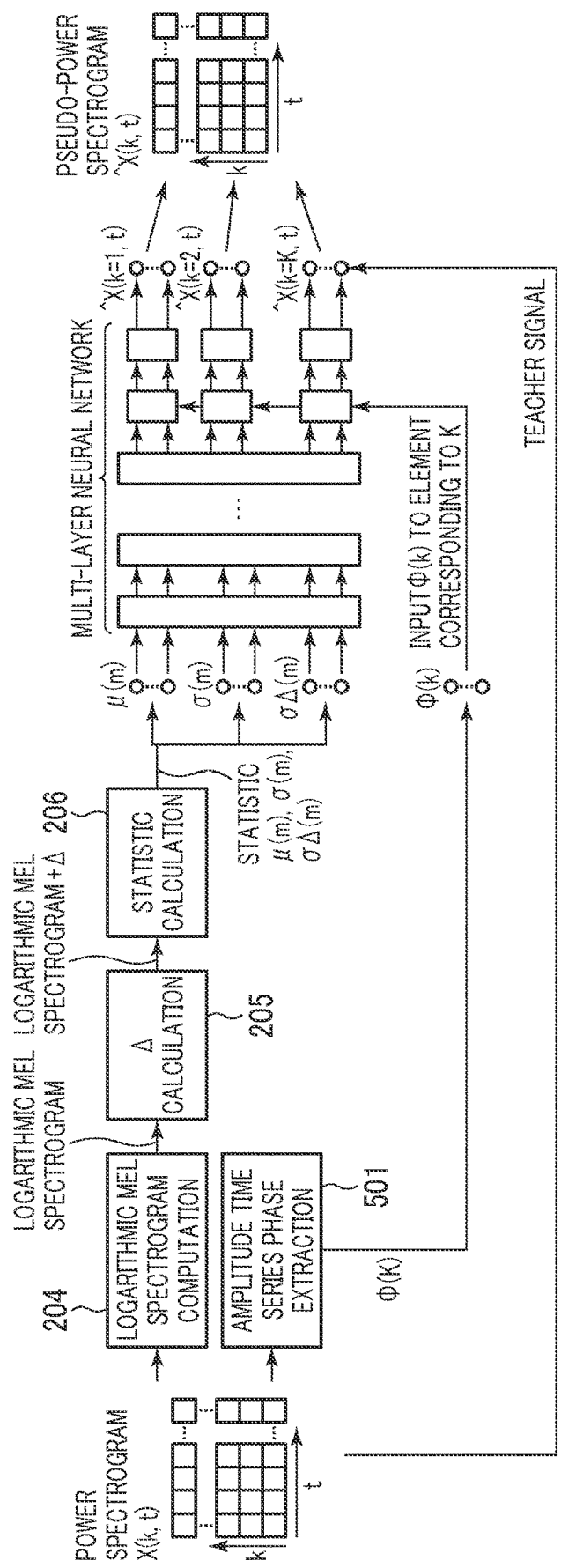
FIG. 5 is a diagram of the configuration of the process of learning mapping that reconstructs a power spectrogram from statistic sets.

FIG. 5 shows the configuration of a process of learning mapping that reconstructs a power spectrogram from a statistic set. The sound surveillance server performs the learning process. The uncompressed raw sound that is recorded in the initial installation and in the initial calibration is converted into a power spectrogram, the power spectrogram is subjected to logarithmic mel spectrogram computation 204, Δ calculation 205, and statistic calculation 206 that are similar on the sound surveillance terminal, and a statistic set ($\mu(m)$, $\sigma(m)$, $\sigma\Delta(m)$) is obtained. Concurrently, phases in an amplitude time series are extracted for frequencies k of the power spectrogram by amplitude time series phase extraction 501. More specifically, for the frequencies k, X (k, :) is subjected to FFT, and a phase $\mu(k)$ of a frequency at the maximum peak is obtained.

The mapping can be modeled using a multi-layer neural network, for example. A multi-layer neural network is prepared in which the statistic set ($\mu(m)$, $\sigma(m)$, $\sigma\Delta(m)$) is used as an input and a pseudo-power spectrogram ˆX (k, t) is outputted. However, the statistic set is split into the frequencies k in an intermediate layer, and the input of $\mu(k)$ is accepted at elements that correspond to the frequencies k in a layer subsequent to the split. In regard to a teacher signal for learning, learning in the multi-layer neural network is performed such that the raw sound is formed into power spectrogram X(k, t) and the difference with the pseudo-power spectrogram ˆX(k, t) that is outputted is small.

Figure 6:
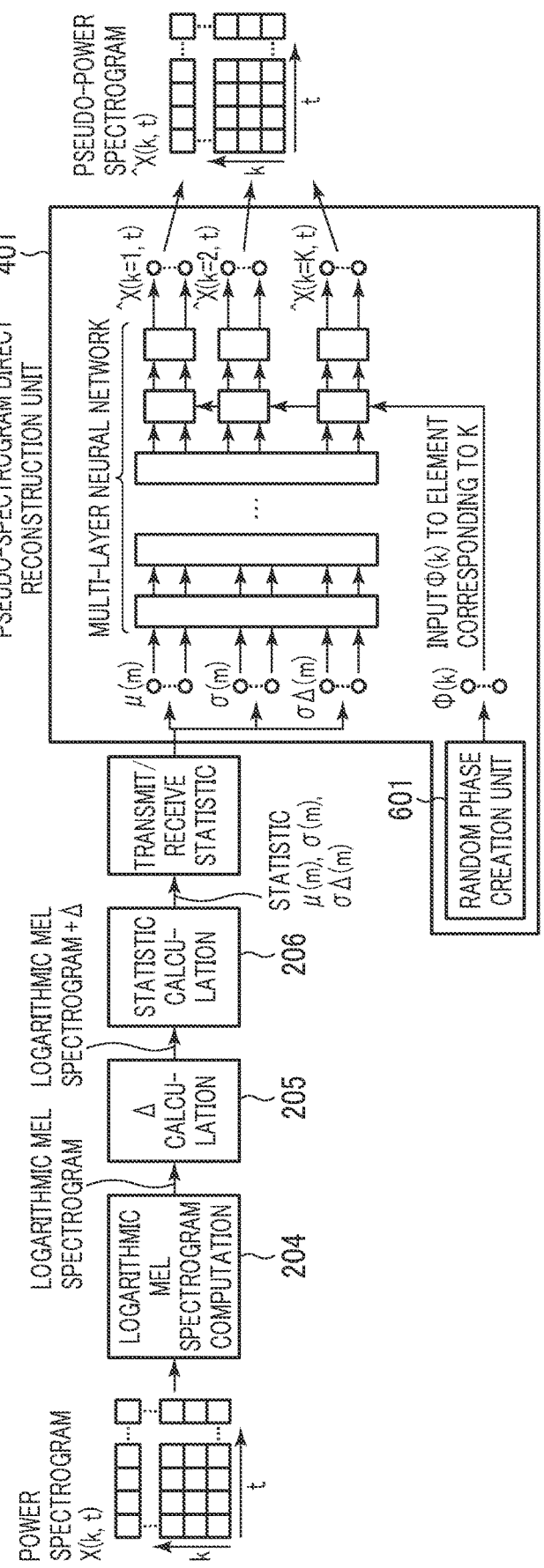
FIG. 6 is a diagram showing the internal configuration of a pseudo-spectrogram direct reconstruction unit.

FIG. 6 shows the internal configuration of the pseudo-spectrogram direct reconstruction unit 401. For easy comparison with FIG. 5, processes on the outer side of the pseudo-spectrogram direct reconstruction unit 401 are swoon together. To the multi-layer neural network that finishes learning, the statistic set ($\mu(m)$, $\sigma(m)$, $\sigma\Delta(m)$) is inputted. A random phase creation unit 601 randomly creates the phases $\varphi(k)$ at the frequencies k, and the phases $\varphi(k)$ are inputted to elements subsequent to the split of the frequencies k in the intermediate layer in the multi-layer neural network.

The abnormal sound detection system including the artificial sound creating function according to the present embodiment can highly accurately create an artificial sound even though the operating sound of the target facility has a micro harmonic structure. Since a series of the learning process and a series of the reconstitution process are both performed at the sound surveillance server, the power consumption of the sound surveillance terminal is not increased, which is advantageous. Since a sound close to a raw sound before compressed is used for learning the normal sound model, the accuracy of abnormality detection is improved, which is advantageous.

Fourth Embodiment

In a fourth embodiment, an example of an abnormal sound detection system including an artificial sound creating function is disclosed in which abnormality detection is enabled, even in the case in which a non-stationary sound, such as ambient noise, is mixed. The difference of the present embodiment from the first embodiment is in that an artificial sound created from (pseudo-logarithmic mel spectrogram) a statistic set is used not only in the creation of an artificial sound on the sound surveillance server side but also in abnormality detection on the sound surveillance terminal side.

Figure 7:
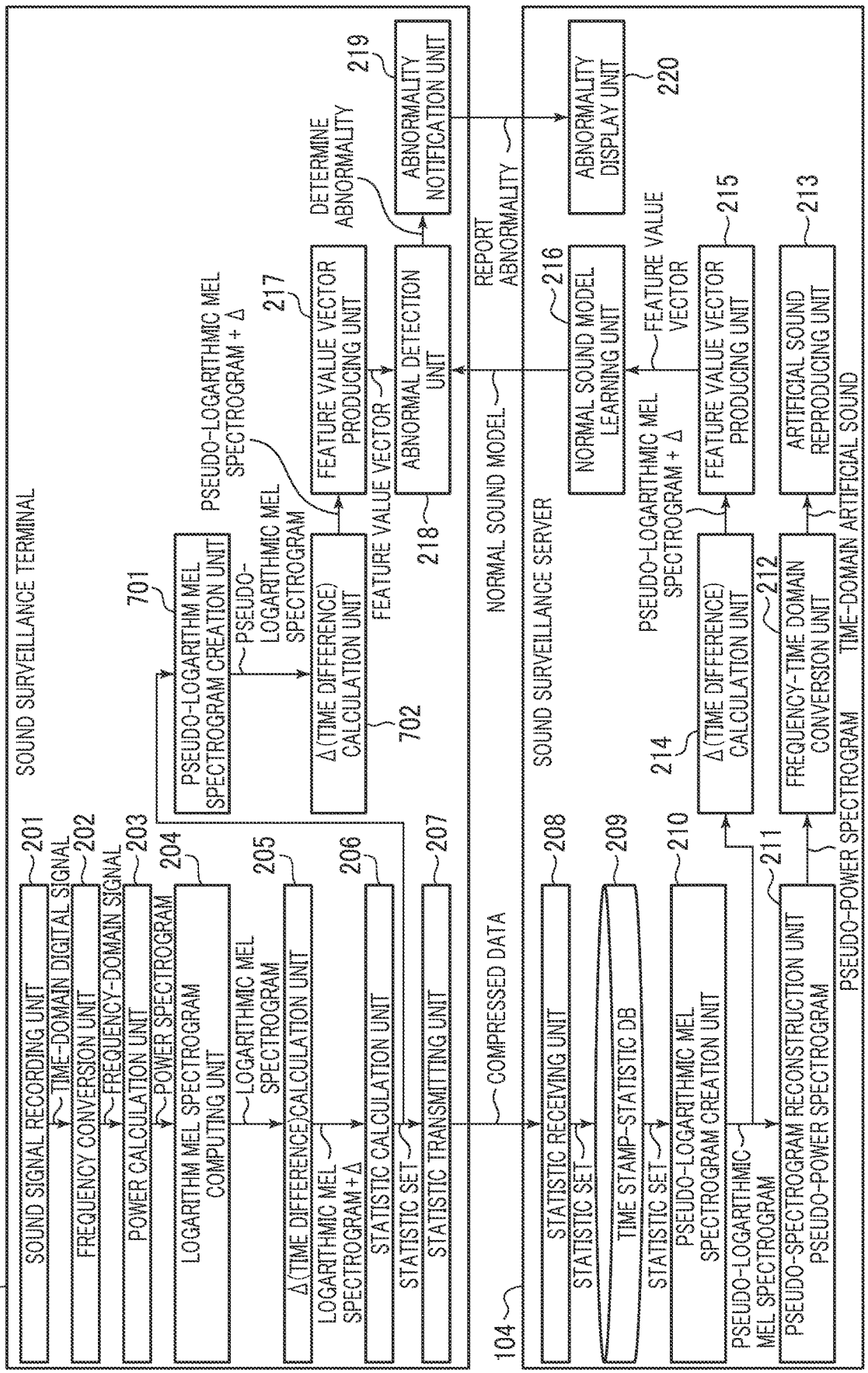
FIG. 7 is a block diagram showing the configuration of processes on a sound surveillance terminal and a sound surveillance server according to a fourth embodiment.

FIG. 7 is a block diagram showing the configuration of the fourth embodiment.

A pseudo-logarithmic mel spectrogram creation unit 701 calculates a pseudo-logarithmic mel spectrogram Z from a statistic set ($\mu(m)$, $\sigma(m)$, $\sigma\Delta(m)$) sent from a statistic calculation unit 206, and outputs the pseudo-logarithmic mel spectrogram Z to a Δ (time difference) calculation unit 702. When it is assumed that the operating sound of the facility is a cyclostationary sound, the components z(m, t) of the pseudo-logarithmic mel spectrogram Z can be calculated from Equation (1).

However, $\gamma$ is a constant parameter ranging from 0 to 1, $\omega = 2 \sin^{-1}(0.5\, \sigma\Delta(m)/\sigma(m))$, $\varphi$ is an option, and r is a probability variable that follows the normal distribution N(0, $\sigma(m)$).

The Δ (time difference) calculation unit 702 calculates, from the pseudo-logarithmic mel spectrogram sent from the pseudo-logarithmic mel spectrogram creation unit 701, its time difference signal Δ, and outputs a set of the pseudo-logarithmic mel spectrogram and Δ to a feature value vector producing unit 217.

Note that the present invention is not limited to the embodiments, and includes various exemplary modifications. For example, the embodiments are described in detail for easily understanding the present invention, and the present invention is not necessarily limited to ones including all the described configurations that are described. A part of the configuration of an embodiment can be replaced with the configuration of another embodiment, and the configuration of another embodiment can be added to the configuration of an embodiment as well. In regard to a part of the configurations of the embodiments, another configuration can be added, removed, and replaced.

A part of or all the configurations, functions, processing parts, processing units, and any other elements may be implemented by hardware, such as design using an integrated circuit, for example. The configurations and functions, for example, may be implemented by software in which a processor interprets a program that implements and executes the functions. Information, such as programs, tables, files, and any other data, that implements the functions can be placed on a recording device, such as a memory, hard disk, and SSD (Solid State Drive), or on a recording medium, such as an IC card, SD card, and DVD.

The abnormal sound detection systems including the artificial sound creating function according to the embodiments are examples that determine an abnormal sound that is possibly included in the operating sound of the facility. For example applications, the abnormal sound detection systems are not limited to this, and are also applicable to a system determining that sound data taken at a specific place or a specific environment includes an abnormal sound that is not created from a normal sound model, which learns in normal time, at a sufficient probability.

What is claimed is:

1. An abnormal sound detection system that determines an abnormal sound included in sound data, the abnormal sound detection system comprising:
a terminal and a server,
wherein: the terminal has a logarithmic mel spectrogram computing unit configured to accept an input of the sound data and compute a logarithmic mel spectrogram, a statistic calculation unit configured to calculate a statistic set that expresses sizes of a direct current component, an alternating current component, and a noise component in an amplitude time series at each of frequencies from the logarithmic mel spectrogram, and a statistic transmitting unit configured to transmit the statistic set;

the server has a statistic receiving unit configured to receive the statistic set, a feature value vector creation unit configured to extract a feature value vector from a pseudo-logarithmic mel spectrogram created from the statistic set, and a normal sound model learning unit configured to learn a normal sound model using the feature value vector;

the terminal extracts a feature value vector from the logarithmic mel spectrogram;

the terminal receives a normal sound model from the server;

the terminal computes a value corresponding to a probability or a distance where the feature value vector is created from the normal sound model; and the terminal determines that operating sound includes an abnormal sound when the value corresponding to the probability or the distance is less than a predetermined value and makes a report to the server.

2. The abnormal sound detection system according to claim 1, wherein the logarithmic mel spectrogram computing unit is further configured to compute a given spectrogram that expresses an octave band spectrogram, a one-third octave band spectrogram, a gamma tone spectrogram, or a frequency power characteristic.

3. The abnormal sound detection system according to claim 1, further comprising on a previous stage of the logarithmic mel spectrogram computing unit of the terminal, a non-stationary component removing unit configured to remove non-stationary sound from a power spectrogram created from the inputted sound data and extract a cyclostationary sound.

4. The abnormal sound detection system according to claim 1, wherein, in the server, a pseudo-spectrogram direct reconstruction unit is further included, the pseudo-spectrogram direct reconstruction unit being configured to, based on an uncompressed operating sound recorded beforehand from a diagnosis target facility and a statistic set expressing sizes of a direct current component, an alternating current component, and a noise component in an amplitude time series at each of frequencies calculated from the uncompressed operating sound, learn mapping from the statistic set to a spectrogram of an uncompressed sound, and create a pseudo-power spectrogram from the statistic set received in the server based on the learned mapping.

5. The abnormal sound detection system according to claim 4, wherein a configuration is provided in which the learned mapping is modeled in a multi-layer neural network, a random phase creation unit randomly creates a phase $\varphi(k)$ at each of frequencies, and the phases $\varphi(k)$ are inputted to elements subsequent to a split of the frequencies in an intermediate layer in the multi-layer neural network.

6. The abnormal sound detection system according to claim 1, wherein: the terminal creates a pseudo-logarithmic mel spectrogram from the statistic set computed at the statistic calculation unit;

the terminal extracts a feature value vector from a set of the pseudo-logarithmic mel spectrogram and a time difference signal of the pseudo-logarithmic mel spectrogram;

the terminal receives a normal sound model from the server;

the terminal computes a probability that the feature value vector is created from the normal sound model; and the terminal determines that operating sound includes an abnormal sound when the probability is less than a predetermined probability, and makes a report to the server.

* * * * *